United States Patent
Bamford et al.

(10) Patent No.: US 9,001,055 B2
(45) Date of Patent: Apr. 7, 2015

(54) PORTABLE DEVICE AND METHOD FOR OPERATING PORTABLE DEVICE

(75) Inventors: Drew Bamford, Bellevue, WA (US); Paul Kristopher Cole, Bellevue, WA (US); Chuan-Feng Yeh, Taoyuan County (TW); Sheng-Hsin Huang, Taoyuan County (TW); Hsu-Jung Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 251 days.

(21) Appl. No.: 13/292,095

(22) Filed: Nov. 9, 2011

(65) Prior Publication Data

US 2012/0287059 A1    Nov. 15, 2012

Related U.S. Application Data

(60) Provisional application No. 61/417,400, filed on Nov. 26, 2010.

(51) Int. Cl.
*G06F 3/041* (2006.01)
*G06F 3/0488* (2013.01)
*G06F 3/0486* (2013.01)

(52) U.S. Cl.
CPC .......... *G06F 3/0488* (2013.01); *G06F 3/0486* (2013.01)

(58) Field of Classification Search
CPC .............................. G06F 3/0486; G06F 3/0488
USPC ........................... 345/440, 172–173; 715/769
See application file for complete search history.

(56) References Cited

U.S. PATENT DOCUMENTS

| 2004/0021643 | A1  | 2/2004  | Hoshino et al. |
| 2005/0246664 | A1* | 11/2005 | Michelman et al. .......... 715/856 |
| 2008/0165140 | A1* | 7/2008  | Christie et al. ................ 345/173 |
| 2009/0259959 | A1* | 10/2009 | Grotjohn et al. .............. 715/769 |
| 2009/0267909 | A1  | 10/2009 | Chen et al. |
| 2010/0122194 | A1* | 5/2010  | Rogers .......................... 715/769 |
| 2010/0295789 | A1  | 11/2010 | Shin et al. |

(Continued)

FOREIGN PATENT DOCUMENTS

| CN | 101286100 A | 10/2008 |
| EP | 1422599     | 5/2004  |

(Continued)

OTHER PUBLICATIONS

"Office Action of Europe Counterpart Application", issued on Feb. 27, 2013, p. 1-p. 9.

(Continued)

*Primary Examiner* — Quan-Zhen Wang
*Assistant Examiner* — Tony Davis
(74) *Attorney, Agent, or Firm* — Jianq Chyun IP Office

(57) ABSTRACT

The invention is directed to a method for operating a portable device. The portable device comprises a touch screen displaying a plurality of objects. The method comprises steps of receiving a touch signal through a contacted location on the touch screen to select one of the objects corresponding to the contacted location, wherein the touch signal is correspondent with a continued pressing motion and a dragging motion following the continued pressing motion on the touch screen. According to the continued pressing motion, at least a button corresponding to an operating function is displayed on the touch screen. When the dragging motion is towards to the button corresponding to the operating function, the operating function is executed on the selected object.

4 Claims, 3 Drawing Sheets

(56) References Cited

U.S. PATENT DOCUMENTS

2011/0004602 A1* 1/2011 Qiu et al. .................. 707/755
2011/0035145 A1* 2/2011 Yamasaki .................. 701/200

FOREIGN PATENT DOCUMENTS

| EP | 1739533 | | 1/2007 |
| JP | 200367135 | A | 3/2003 |
| TW | 200916166 | | 4/2009 |
| TW | 201005599 | | 2/2010 |
| WO | 2009128496 | A1 | 10/2009 |

OTHER PUBLICATIONS

"Search Report of Europe Counterpart Application", issued on Jul. 6, 2012, p. 1-p. 6.
"Office Action of Europe Counterpart Application", issued on Sep. 20, 2013, p. 1-p. 12.
"First Office Action of China Counterpart Application", issued on Jan. 13, 2014, p. 1-p. 12.
"Office Action of Taiwan Counterpart Application", issued on Feb. 18, 2014, p. 1-p. 6.

* cited by examiner

PORTABLE DEVICE AND METHOD FOR OPERATING PORTABLE DEVICE

CROSS-REFERENCE TO RELATED APPLICATION

This application claims the priority benefit of U.S. Provisional Application Ser. No. 61/417,400, filed Nov. 26, 2010. The entirety of the above-mentioned patent application is hereby incorporated by reference herein and made a part of this specification.

BACKGROUND OF THE INVENTION

1. Field of Invention

The present invention relates to a portable device and a method for operating the portable device. More particularly, the present invention relates to a portable device and a method for operating the portable device capable of rapidly executing functions on objects shown on the screen.

2. Description of Related Art

Generally, an electronic apparatus or application software on the market is designed with a human-machine interface for a user to execute various functions of the electronic apparatus conveniently. Since a size of a hard drive is limited, various function options of all electronic apparatuses can not represented completely in a displaying region of the same hard drive. Therefore, the human-machine interface has to be simplified; that is, limited numbers of main function options or path tags are disposed within a visible region of a current display. Alternatively, other secondary options are hidden under various main function options or sub-directories of the main path tags in a manner of sub-options.

Thus, when operating the electronic apparatus or application software, the user is usually required to operate through multiple directories and paths to find the needed option to further perform the operation. Moreover, the icon representing each main directory and path is usually over-simplified or can not express the directory, path, or operation function clearly, so that the user is not capable of finding the directory to be opened or the function operation to be executed merely in one blink of an eye in a selection list having various icon options. Hence, the difficulty for the user to operate the electronic apparatus is enhanced and the time for the user to operate the options in the selection list is increased. In addition, when the user is unfamiliar with operation of the electronic apparatus or application software, the user has to search for the function or path to be selected in the directories under various main options, thereby reducing the user's interest to operate this electronic apparatus or application software.

SUMMARY OF THE INVENTION

Accordingly, at least one objective of the present invention is to provide a method for operating a portable device capable of simplifying the operating process for the user to operate the portable device.

At least another objective of the present invention is to provide a portable device capable for the user to intuitively operate the portable device.

To achieve these and other advantages and in accordance with the purpose of the invention, as embodied and broadly described herein, the invention provides a method for operating a portable device. The portable device comprises a touch screen displaying a plurality of objects. The method comprises steps of receiving a touch signal through a contacted location on the touch screen to select one of the objects corresponding to the contacted location, wherein the touch signal is correspondent with a continued pressing motion and a dragging motion following the continued pressing motion on the touch screen. According to the continued pressing motion, at least a button corresponding to an operating function is displayed on the touch screen. When the dragging motion is towards to the button corresponding to the operating function, the operating function is executed on the selected object.

According to one embodiment of the invention, each of the objects represents a widget, an application, a text file, a picture file or a multi-media file.

According to one embodiment of the invention, the operating function includes an editing function, a communication function or a setting function.

According to one embodiment of the invention, the step of displaying at least the button corresponding to an operating function on the touch screen further comprises determining whether the selected object has a setting file, and when the selected object has a setting file, displaying the button corresponding to the operating function which is a setting function on the touch screen.

According to one embodiment of the invention, the step of executing the operating function on the selected object comprises opening the setting file.

According to one embodiment of the invention, the button is displayed in a button region expanding along a side of the touch screen.

The invention further provides a portable device. The portable device comprises a touch screen, a storage medium and a processor. The touch screen displays a plurality of objects. The storage medium stores a computer readable and writable program. The processor executes a plurality of commands of the computer readable and writable program. The commands comprises receiving a touch signal through a contacted location on the touch screen to select one of the objects corresponding to the contacted location, wherein the touch signal is correspondent with a continued pressing motion and a dragging motion following the continued pressing motion. According to the continued pressing motion, at least a button corresponding to an operating function is displayed on the touch screen. When the dragging motion is towards to the button corresponding to the operating function, the operating function is executed on the selected object.

According to one embodiment of the invention, each of the objects represents a widget, an application, a text file, a picture file or a multi-media file.

According to one embodiment of the invention, the operating function includes an editing function, a communication function or a setting function.

According to one embodiment of the invention, the command of displaying at least the button corresponding to the operating function on the touch screen further comprises: determining whether the selected object has a setting file, and when the selected object has a setting file, displaying the button corresponding to the operating function which is a setting function on the touch screen.

According to one embodiment of the invention, the command of executing the operating function on the selected object comprises opening the setting file.

According to one embodiment of the invention, the button is displayed in a button region expanding along a side of the touch screen.

In the present invention, while a touch signal correspondent with at least a continued pressing motion is sensed, a button corresponding to an operating function is displayed for the user to operate the object corresponding to the contact location where the continued pressing motion is sensed. That is, by directly touch the touch screen on the spot where the object is located, the user can intuitively operate the object displayed by the touch screen without further pressing any other physical or virtual buttons to find out the desired function and then to execute the function on the selected object. Hence, the operating process is simplified for the user to use the portable device.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
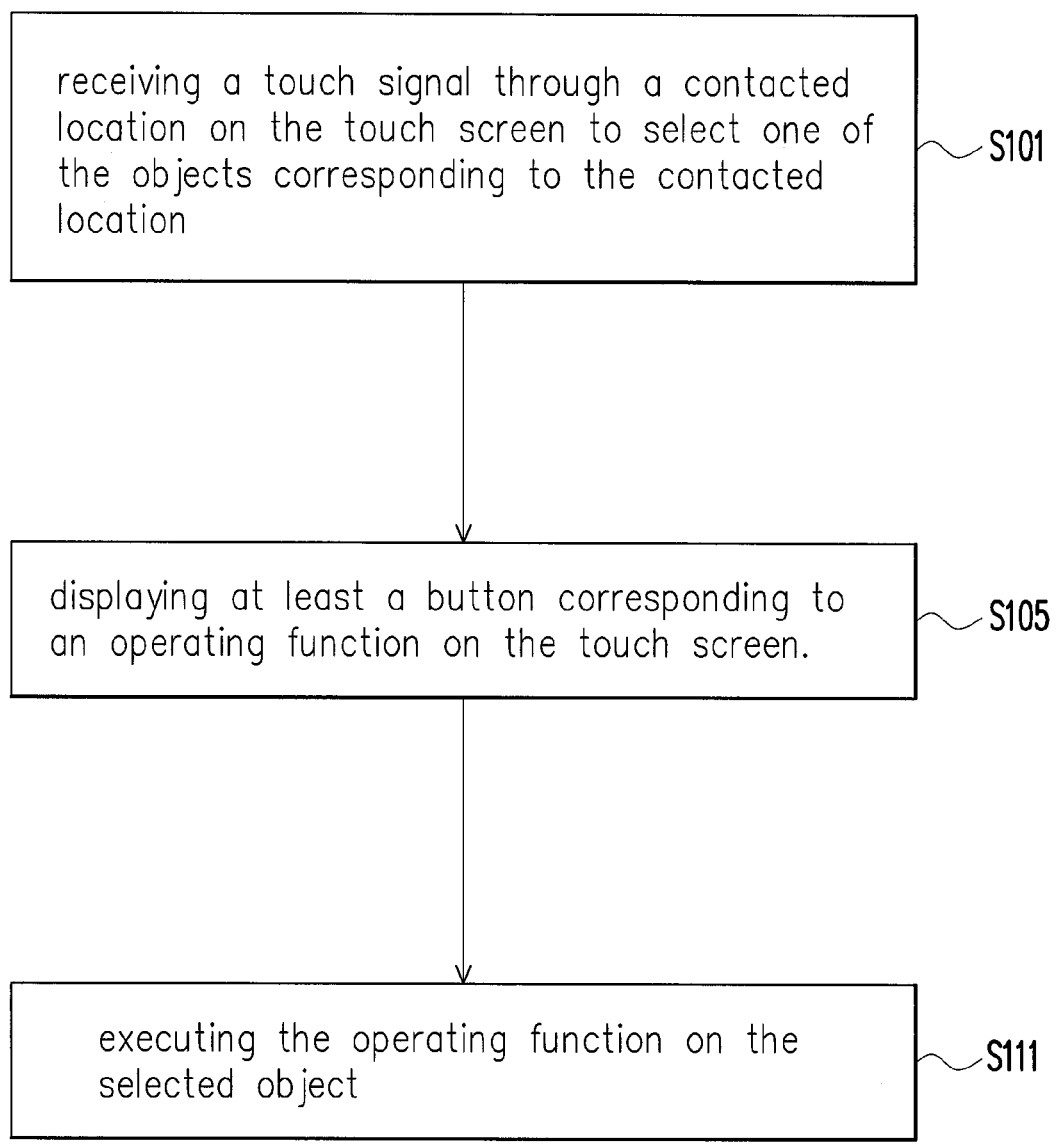
FIG. 1 is a process flow chart schematically illustrating a method for operating a portable device according to one embodiment of the invention.

FIG. 1 is a process flow diagram, schematically illustrating a method for operating a portable device according to one embodiment of the invention. FIGS. 2A through 2D are schematic diagrams showing a method for opening a setting file of an object on the screen according to one embodiment of the invention. In the present embodiment, a method for operating a portable device is illustrated. The portable device can be, for example, a smart phone, a personal digital assistant, a notebook, an e-book or other portable electronic device.

Figure 2A:
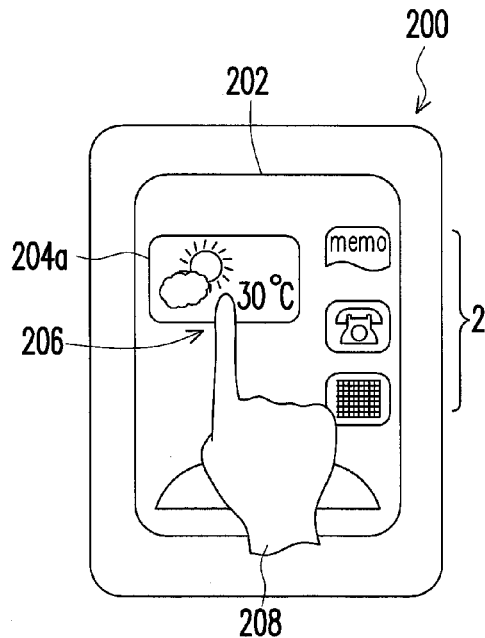
FIGS. 2A through 2D are schematic diagrams showing a method for opening a setting file of an object on the screen according to one embodiment of the invention.

Furthermore, as shown in FIGS. 2A through 2D, the portable device 200 comprises a touch screen 202 displaying a plurality of objects 204. It should be noticed that each of the objects can be a graphic object representing a widget, an application, a text file, a picture file or a multi-media file, for example. As shown in FIG. 1 and FIG. 2A, in the step S101, the portable device 200 receives a touch signal through a contacted location 206 on the touch screen 202 to select one of the objects 204 corresponding to the contacted location 206. That is, the user 208 touches the touch screen 202 on the contacted location 206 with a contact motion so that the touch screen 202 generates a touch signal according to the contact motion. In the present embodiment, the user 208 uses the index finger of right hand to touch the touch screen 202. However, the invention does not limited by the expression made in FIG. 2A. In other words, the user can use other fingers of the right hand or left hand or use stylus to touch the touch screen 202. It should be noticed that the touch signal is correspondent with the contact motion of the user 208 which may include a continued pressing motion and a dragging motion following the continued pressing motion on the touch screen 202.

Figure 2B:
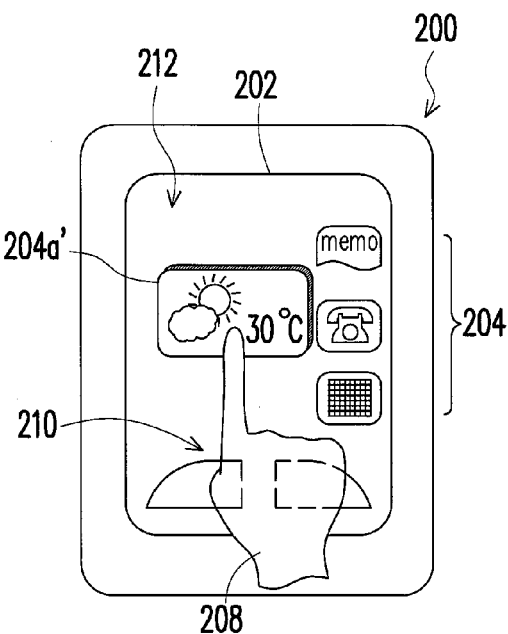

As shown in FIG. 1 and FIG. 2B, in the step S105, according to the continued pressing motion, at least a button 210 corresponding to an operating function is displayed on the touch screen 202. Noticeably, the operating function can be, for example, an editing function, a communication function or a setting function. Also, the button 210 can be displayed, for example, in a button region expanding along a side of the touch screen. As shown in FIG. 2B, in the present embodiment, the button region is located at the bottom of the touch screen while the portable device is disposed in a proper viewed position with respect to the user. However, the position of the button region does not limit the scope of the present invention. Furthermore, in one embodiment, when the continued pressing motion on the contacted location 206 on the touch screen 202 is sensed, in order to respond to the continued pressing motion, the selected object 204a is changed to be displayed as an object 204a' floating over the background frame 212 and ready to be moved over the background frame 212.

Figure 2C:
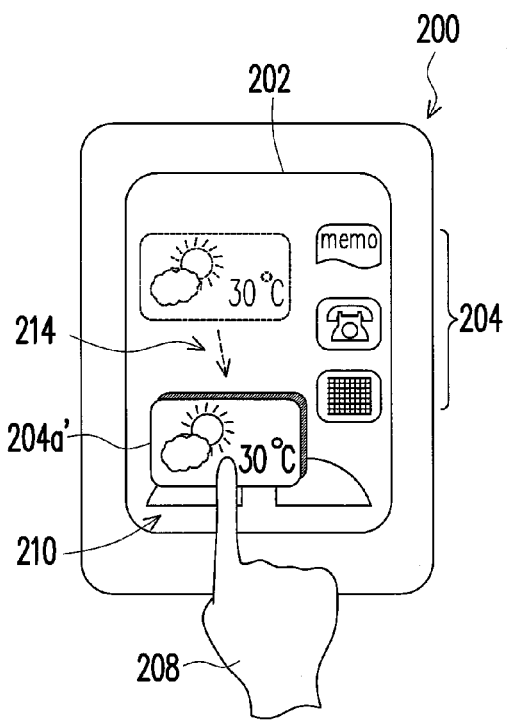

As shown in FIG. 1 and FIG. 2C, in the step S111, when the dragging motion is towards to the button 210 corresponding to the operating function (the dotted arrow 214 shown in FIG. 2C), the operating function corresponding to the button 210 is executed on the selected object 204a. That is, according to the dragging motion 214, the selected object 204a' is dragged towards to the button 210 so as to execute the operating function corresponding to the button 210 on the selected/moved object 204a'. It should be noticed that, instead of actually changing the file path or the position displayed on the touch screen of the selected/moved object according to the dragging motion to drag the object to a specific directory, in the present invention, the action of dragging the object to the button is to quickly implement a specific operating function corresponding to the button on the selected/moved object while the directory and the position displayed on the touch screen of the selected/moved object remain unchanged.

In the previous embodiment, the button corresponding to the operating function is displayed according to the continued pressing motion of the user. However, the present invention is not limited to the correlation between the continued pressing motion and the display of the button corresponding to the operating function. In the following paragraph, another embodiment of displaying the button corresponding to the operating function is detailed.

Figure 3:
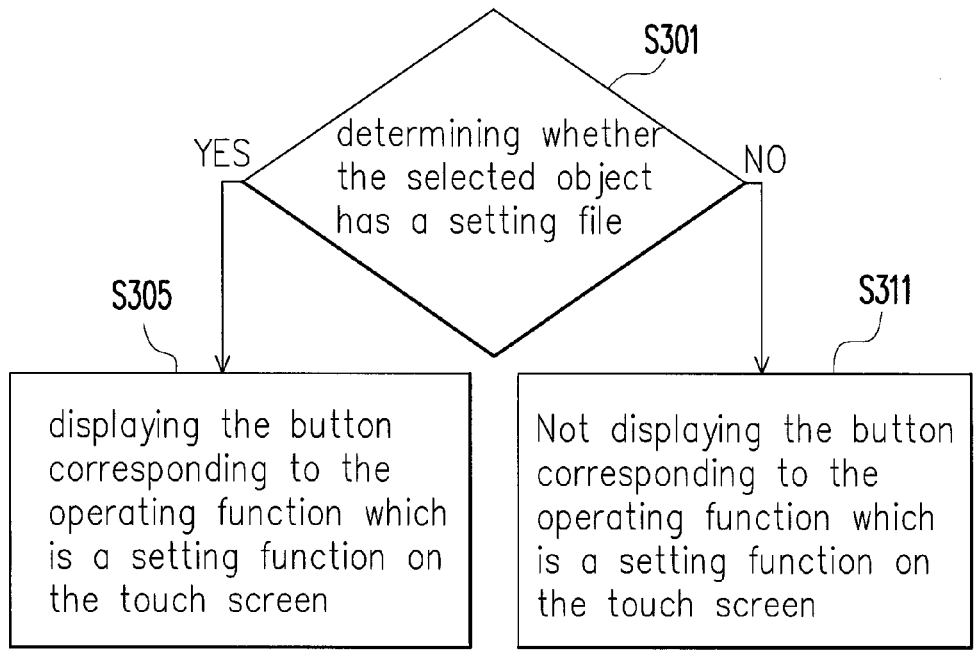
FIG. 3 is a process flow chart schematically illustrating the step of displaying at least a button corresponding to an operating function on the screen according to one embodiment of the invention.

FIG. 3 is a process flow chart schematically illustrating the step of displaying at least a button corresponding to an operating function on the screen according to one embodiment of the invention. As shown in FIG. 3, in the step S301, it is determined that whether the selected object support a functional operation or has a functional file such as a setting file while the portable device 200 receives the touch signal correspondent with at least a continued pressing motion.

Figure 2D:
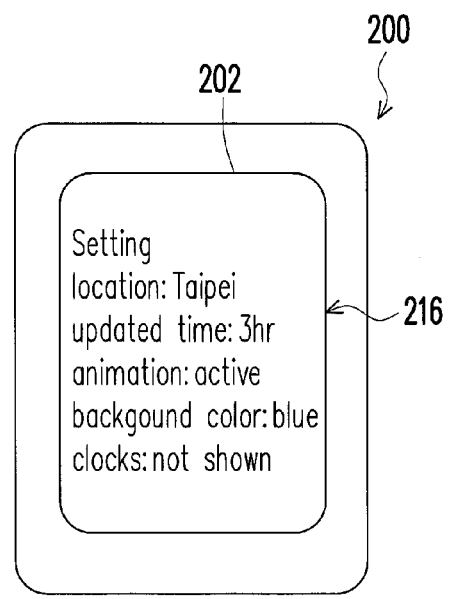

In the step S305, when the selected object 204a has a setting file, the button corresponding to the operating function which is a setting function is displayed on the touch screen 202. Alternatively, in the step S311, when the selected object 204a does not have any setting file, the button corresponding to the operating function which is a setting function is not displayed on the touch screen 202. Moreover, in the same embodiment, when the object has the setting file and is dragged to the button corresponding to the setting function, the setting file 216 is opened accordingly in another page or window (as shown in FIG. 2D) and is displayed by the touch screen 202.

Figure 4:
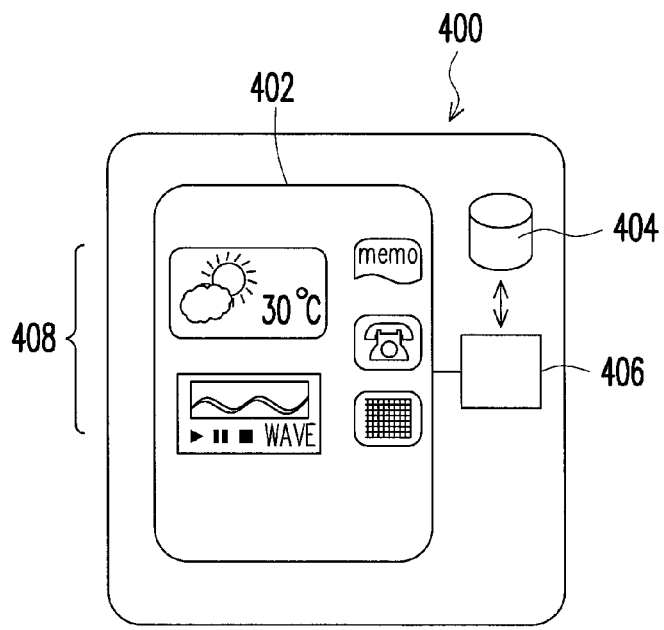
FIG. 4 is a schematic diagram showing a portable device according to one embodiment of the invention.

FIG. 4 is a schematic diagram showing a portable device according to one embodiment of the invention. As shown in FIG. 4, the portable device 400 comprises a touch screen 402, a storage medium 404 and a processor 406. The touch screen 402 connected to the processor 406 displays a plurality of objects 408. The method for operating the portable device mentioned in the previous embodiment can be implemented by a computer readable and writable program, and the storage medium 404 stores the computer readable and writable program. The processor 406 loads the computer readable and writable program and executes a plurality of commands of the computer readable and writable program to implement the method of the present invention. The commands are corresponding to the steps mentioned in the previous method embodiment respectively and are not detailed herein. The commands comprises receiving a touch signal through a contacted location on the touch screen to select one of the objects corresponding to the contacted location (step S101); according to the continued pressing motion, displaying at least a button corresponding to an operating function on the touch screen (step S105); when the dragging motion is towards to the button corresponding to the operating function, executing the operating function on the selected object (steps 111). Furthermore, in one embodiment, the command of displaying at least the button corresponding to an operating function on the touch screen comprises determining whether the selected object has a setting file (step S301), and when the selected object has a setting file, displaying the button corresponding to the operating function which is a setting function on the touch screen (S305).

In the present invention, while a continued pressing motion is sensed, at least a button corresponding to an operating function is displayed accordingly so that the user can drag the object to the button to operate the object corresponding to the contact location where the continued pressing motion is sensed. That is, by directly touch the touch screen on the spot where the object is located, the user can intuitively operate the object only by simply dragging the object without further pressing any other physical or virtual buttons to find out the desired function and then to execute the function on the selected object. Hence, the operating process is simplified for the user to use the portable device.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for operating a portable device, wherein the portable device comprises a touch screen displaying a weather widget, the method comprising:

receiving a touch signal through a contacted location on the touch screen to select the weather widget, wherein the touch signal is correspondent with a continued pressing motion and a dragging motion following the continued pressing motion on the touch screen, wherein a weather image and a temperature message are displayed on the weather widget, wherein the weather image and the temperature message indicating weather information of a preset location;

according to the continued pressing motion, determining whether the weather widget has a setting file, and displaying at least a button corresponding to a setting function on the touch screen if the weather widget has the setting file;

before the weather widget is dragged, responding to the continued pressing motion, changing the weather widget to be displayed as an object floating over a background frame and ready to be moved over the background frame; and according to the dragging motion, dragging the weather widget to the button corresponding to the setting function, and displaying a window of the setting file in response to the weather widget being dragged to the button corresponding to the setting function, wherein setting information of the weather widget are displayed on the window and the setting information comprises a name of the preset location.

2. The method of claim 1, wherein the button is displayed in a button region expanding along a side of the touch screen, and the button region is located at a bottom of the touch screen while the portable device is disposed in a proper viewed position.

3. A portable device, comprising:

a touch screen displaying a weather widget;

a storage medium storing a computer readable and writable program;

a processor executing a plurality of commands of the computer readable and writable program, wherein the commands comprises:

receiving a touch signal through a contacted location on the touch screen to select the weather widget, wherein the touch signal is correspondent with a continued pressing motion and a dragging motion following the continued pressing motion, wherein a weather image and a temperature message are displayed on the weather widget, wherein the weather image and the temperature message indicating weather information of a preset location;

according to the continued pressing motion, determining whether the weather widget has a setting file, and displaying a button corresponding to a setting function on the touch screen if the weather widget has the setting file;

before the weather widget is dragged, responding to the continued pressing motion, changing the weather widget to be displayed as an object floating over a background frame and ready to be moved over the background frame; and according to the dragging motion, dragging the weather widget to the button corresponding to the setting function, and displaying a window of the setting file in response to the weather widget being dragged to the button corresponding to the setting function, wherein setting information of the weather widget are displayed on the window and the setting information comprises a name of the preset location.

4. The portable device of claim 3, wherein the button is displayed in a button region expanding along a side of the touch screen, and the button region is located at a bottom of the touch screen while the portable device is disposed in a proper viewed position.

* * * * *